Figure 1:
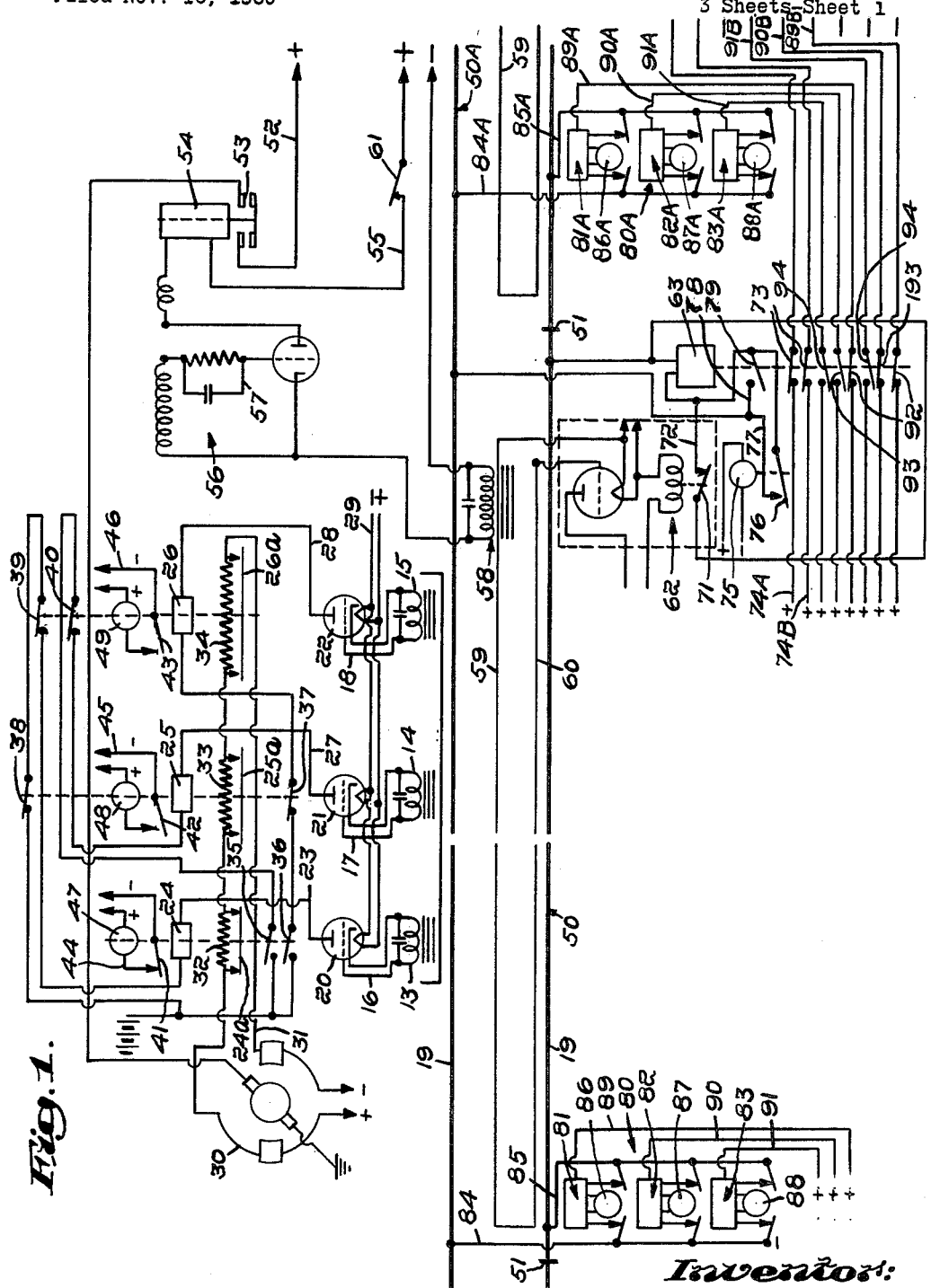

Jan. 4, 1966   J. JOYCE   3,227,870
AUTOMATIC CONTROL FOR TRAINS AND OTHER VEHICLES
Filed Nov. 16, 1960   3 Sheets-Sheet 1

Inventor:
John Joyce,
by [signature]
Attorney

Jan. 4, 1966  J. JOYCE  3,227,870
AUTOMATIC CONTROL FOR TRAINS AND OTHER VEHICLES
Filed Nov. 16, 1960  3 Sheets-Sheet 2
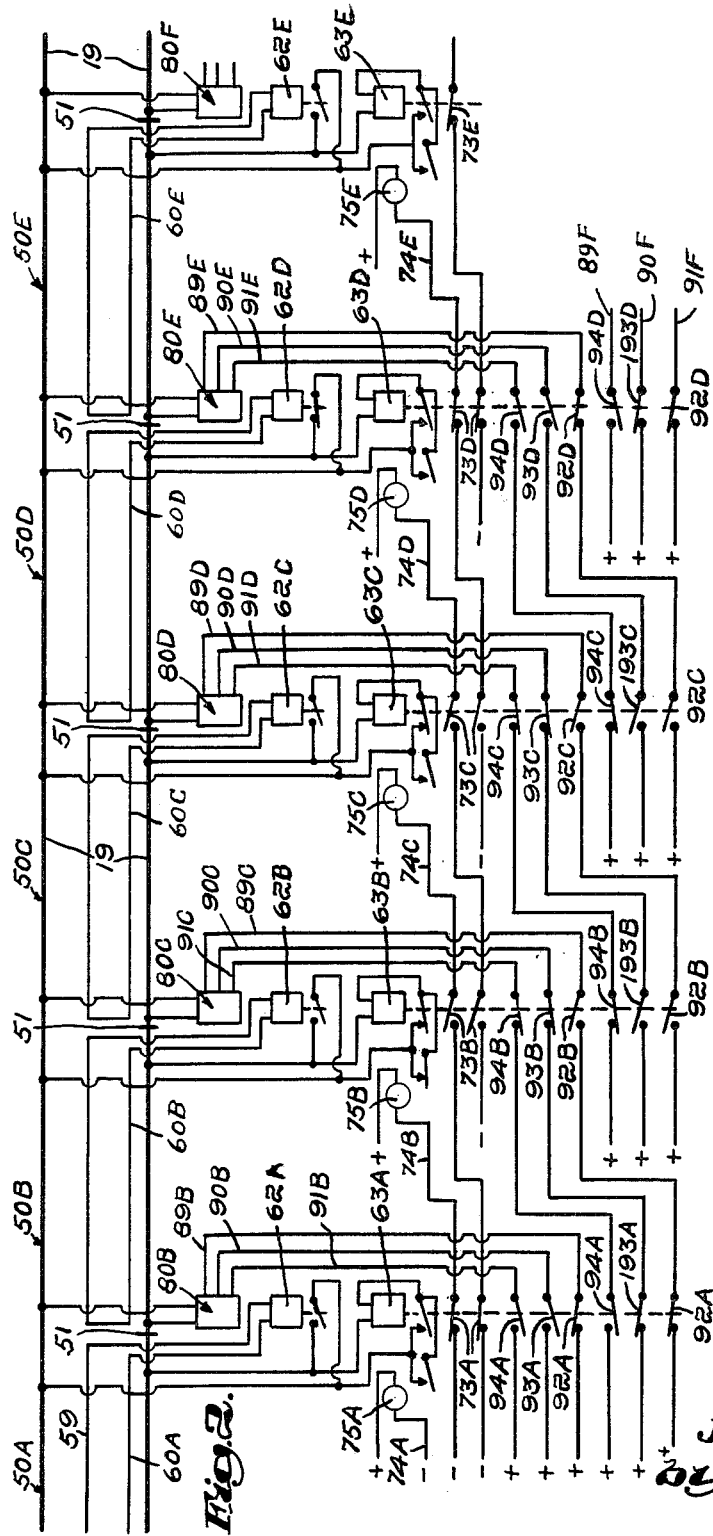
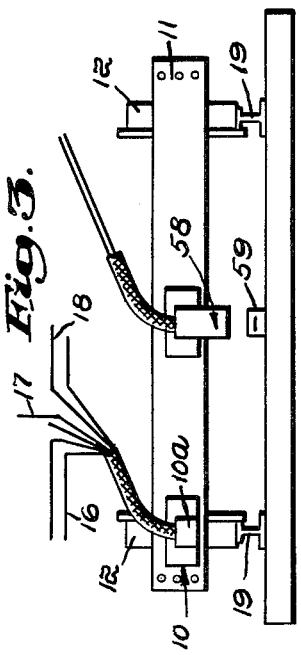
Inventor:
John Joyce,
by Abbott Spear,
Attorney

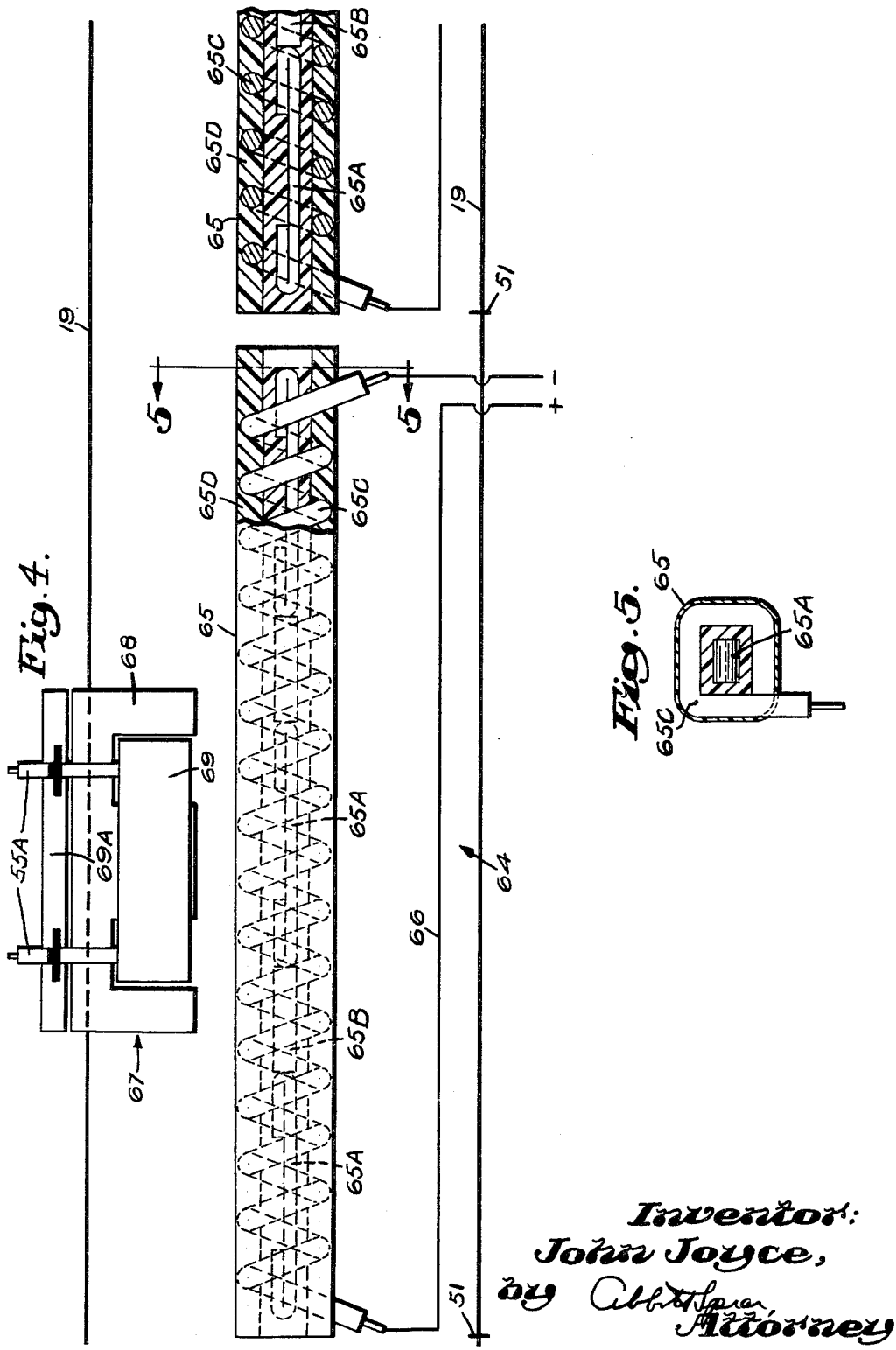

United States Patent Office 3,227,870
Patented Jan. 4, 1966

3,227,870
AUTOMATIC CONTROL FOR TRAINS AND OTHER VEHICLES
John Joyce, Milton, Mass., assignor to John Joyce, Inc., Milton, Mass., a corporation of Massachusetts
Filed Nov. 16, 1960, Ser. No. 69,760
3 Claims. (Cl. 246—34)

This invention relates to automatic controls for trains and other vehicles and is a continuation-in-part of my now abandoned co-pending application, Ser. No. 617,350, filed Oct. 22, 1956.

While the invention is adapted for use in controlling the speed of other vehicles, it is herein discussed with particular reference to trains where the problem of ensuring safe operation has resulted in the use of various types of safety equipment, including automatic stops. Such stops take the control of the train away from the engineer if the stop mechanism is out of order or if the train passes a red light. This basis of control sometimes defeats its own purposes by putting the train and its occupants in danger. In addition, automatic train stops are costly to install and to maintain.

Among the general objectives of the present invention is that of providing a speed control that compels the operator to observe speed rules, that of eliminating rear end collisions attributable to the failure of section relays to shunt due, for example, to foreign matter on the rails in the case of a track guided or track supported vehicle, causing poor contact, and that of not taking control entirely away from the operator.

These objectives are attained by providing the train or other vehicle with a plurality of speed controls, each including a pick-up circuit resonant at a predetermined frequency different from that at which the others resonate. Each speed control, when its pick-up circuit is energized, establishes a predetermined maximum speed different from that established by any other speed control.

Each track section circuit is insulated from the others and carries the current for the coils of the pick-up circuits of the vehicles in it and includes a wayside relay for use in controlling the pick-up circuit or circuits for track sections for the control of following vehicles. Associated with each section circuit is a co-extensive shunting circuit also provided with a wayside relay operable to shunt the section relay out of the section circuit. Each shunting circuit is controlled by the vehicle, preferably with current being delivered thereto inductively and utilizing the cables and combinations disclosed in my co-pending application, Ser. No. 48,784, filed Aug. 10, 1960.

Current to each track section circuit to energize vehicle pick-up circuits is delivered by an appropriate one of a plurality of parallel, wayside oscillators to generate the frequency for an appropriate one of the pick-up circuits. Each oscillator is part of an appropriate one of a plurality of wayside control circuits with which each section is provided and each oscillator control circuit includes switches as part of the wayside equipment of one or more preceding section circuits and operable by the relays thereof.

Each track section relay remains energized once it has been energized until it is shunted out of its section circuit by a vehicle within the section having that particular circuit. A shunted section relay is restored to its circuit by means of an associated checking relay and in a checking circuit provided with one or more switches, each part of the wayside equipment of a preceding section circuit and operable by the section relay thereof.

The function of each track section relay is to operate, in predetermined relation, checking and oscillator circuit switches associated therewith to affect traffic in one or more following track section circuits.

In the accompanying drawings, there are shown illustrative embodiments of the invention, particularly adapted for train control, from which these and other of its objectives, novel features, and advantages will be readily apparent.

In the drawings:

FIG. 1 is a schematic view illustrating the vehicle speed controls and the magnet of the vehicle for energizing the shunting circuits, oscillators for delivering speed control current to the vehicle, a shunting track section circuit, and oscillator control and checking relay circuits, FIG. 2 is a schematic view showing a plurality of track section circuits with their oscillators, shunting relay circuits, and the oscillator control and checking relay circuits controlled by the shunting relays, FIG. 3 is a fragmentary view of a vehicle truck showing parts of the speed control and shunting circuits, FIG. 4 is a fragmentary, schematic view of a preferred shunting circuit, and FIG. 5 is a section taken approximately along the indicated lines 5—5 of FIG. 4.

For convenience, reference is first made to the vehicle whose speed is to be controlled and, in FIG. 3, there is shown a unit 10 carried by the truck frame 11 to be located ahead of, towards the viewer, the first set of wheels 12 of the locomotive. The unit 10 includes, by way of example, and as shown in FIG. 1, tuned coils 13, 14 and 15, in a holder 10$^a$, for the pick-up battery circuits 16, 17 and 18, respectively. Each of the coil circuits 13, 14 and 15 is adapted to resonate when current of a predetermined frequency is present in the track rails 19 of the track section in which the locomotive is travelling. By way of example, the coil circuits 13, 14 and 15 resonate at 23, 49, and 77 cycles, respectively.

The locomotive pick-up circuits 16, 17 and 18 include the grids of control tubes 20, 21 and 22, respectively. The plate circuit 23 of the control tube 20 includes a relay 24 and similar relays 25 and 26 are included in the plate circuits 27 and 28, respectively, of the tubes 21 and 22. In each of the tubes 20, 21 and 22, the grids of the control tubes 20, 21, and 22 are heated by the heaters in the heater circuit 29.

While the invention is adapted to affect the control of train speeds regardless of the type of propulsion, in the embodiment shown in the drawings, speed control is achieved by increasing or decreasing resistances in the output of the generator 30 which powers the propulsion motor in whose field circuit 31 there are indicated resistances 32, 33 and 34 adapted to be shunted by the operation of a respective one of shunting switches 24$^a$, 25$^a$, and 26$^a$ of the relays 24, 25 or 26, respectively. For example, when the relay 24 is energized in response to, say, a 23 cycle current in the track 19, it closes the shunting switch 24$^a$ and thus shunts out the resistance 32 to allow a maximum speed of 25 miles per hour. When the relay 25 is energided, for example, by 49 cycle current in the track 19, the resistance 33 is shunted enabling maximum speeds of 50 miles per hour to be attained. Similarly, when the relay 26 is energized as by 77 cycle current in the track, speeds of , say, 75 miles per hour, maximum, are attainable since the resistance 34 is now shunted out of the circuit 31.

It is preferred option that the total effect of the resistances 32, 33 and 34 be such that, with no current in the track to operate any of the pick-up circuits, the output of the generator 30 is only such that the propulsion motor enables the train to be moved, as in an emergency, at a predetermined slow speed, say, up to ten miles per hour.

As it is desirable that only one pick-up circuit of a train be operated at any one time, it is provided that when the relay 24 is energized, it opens normally closed switches 35 and 36 in the circuits 27 and 28, respectively, and the relay 25, when energized, opens the normally closed switch 37 in the circuit 28 and normally closed switch 38 in the circuit 23. When the relay 26 is energized, it opens normally closed switches 39 and 40 in the circuits 23 and 27, respectively. By these or equivalent means, it is impossible for a pick-up circuit to be closed that establishes a higher speed than the attendant operating circumstances warrant.

Each of the relays 24, 25 and 26 when energized, is also operative to close a respective one of the normally open switches 41, 42 and 43 in circuits 44, 45 and 46, respectively, located in the cab, not shown. The circuits 44, 45, and 46 include signals such as, for example, different colored lights 47, 48 and 49, respectively.

In order for suitable pick-up currents to be delivered to the track 19 in any generally indicated section 50, 50A, 50B, 50C, 50D, or 50E which sections are insulated from each other at 51 for the operation of a train, the preceding train must initiate control under certain circumstances and means for so doing will now be detailed. It is suggested that the drawings be arranged with FIG. 2 disposed at the right of FIG. 1 but with the track 19 of FIG. 1 in alinement with the track 19 of FIG. 2.

A manually opened and closed lead 52 from the generator 30 to the propulsion motor, not shown, includes a relay switch 53 closed when the relay 54 is energized. The relay 54 is in a circuit 55 including a generally indicated oscillator 56 having a tuned or tank circuit 57 to generate a selected inductive frequency in the inductive shunting electro-magnetic coil 58 mounted on the end of the truck frame 11 and located in FIG. 1 over the inductive shunting cable 59 between the track rails 19 of the section 50 and constituting a part of the shunting circuit 60. The relay 54 is energized whenever the switch 61 controlling the circuit 55 is closed.

The shunting cable 59 extends the length of the track section 50 and the shunting circuit 60 is also provided with a shunting relay 62 as part of the wayside equipment adjacent the proximate ends of the track sections 50 and 50A. The rails of the section 50 constitute a track or section circuit including a section relay 63 which remains energized as long as the shunting cable 59 and the locomotive coil 58 are inductively coupled. Because the coupling is inductive, intervening foreign matter will not and cannot defeat the operation of the shunting circuit control of the section relay 63.

Reference is now made to FIGS. 4 and 5 wherein there is shown a track section 64 similar to the track sections previously described except that the shunting portion 65 of its shunting circuit 66 is made in accordance with application Serial No. 48,784, filed Aug. 10, 1960. The shunting portion 65 consists of an insulated core including magnetic parts 65A each spaced from the other by a nonmagnetic spacer 65B and a circuit wire 65C is coiled about the insulated core and is itself encased by a suitable insulating cover 65D. The magnet member of the vehicle is indicated at 67 and is of the type including a yoke 68 supporting an electro-magnet 69 and a capacitor 69A in the vehicle circuit 55A. The use of an electro-magnet is preferred over a permanent magnet as the former affords safe control even when the vehicle is not in motion. For convenience, the magnetic member is not shown directly over the shunting portion 65 but it will be understood that in practice it is spaced above it.

From the foregoing, it will be apparent that whatever the frequency (in cycles) of the current delivered to the track section 50, its section or track relay 63 is energized unless there is a train in that section, in which case, the relay 63 is shunted out by the relay 62 which closes the normally open switch 71 in the shunting lead 72. As there are a number of relay-controlled switches, it will be helpful to bear in mind that the terms "normally open" and "normally closed" as applied thereto or the term "normal position" characterize the position of a switch when its relay is controlled as it would be with no traffic in a track section.

The track section relay 63, until shunted out, also is operative to open normally closed switches 73 in checking circuits, such as the checking circuits 74A and 74B, respectively, to the checking relays 75A and 75B of the track sections 50A and 50B, respectively. At this point, it is to be noted that as the track sections and the wayside equipment for each section are identical to that of the section 50, the same reference numerals are employed for the different parts thereof at the various sections, but these are given the suffix distinction of the appropriate letter characterizing the several track sections.

Each checking circuit has a pair of switches each operable by a respective one of the next two preceding track section relays. For example, the checking circuit 74A also includes a switch not shown, controlled by the track relay of the track section ahead of or to the left of the track section 50 and the checking circuit 74B also includes a switch 73A controlled by the track relay 63A of the track section 50A. Each checking relay, the checking relay 75, for example, when energized, closes a normally open switch 76 in a lead 77 to the track section relay 63 which has a holding circuit 78 provided with a relay controlled switch 79. It will be noted that a checking relay cannot be energized unless the next two preceding track sections have had their section relays shunted out and that its function is to effect the re-energization of a track section relay.

As the invention has been discussed with three different maximum speeds being established in each track section by 23, 49 and 77 cycle current, the wayside unit for the section 50, generally indicated at 80 in FIG. 1, is shown as including 23, 49 and 77 cycle oscillators, generally indicated at 81, 82 and 83, respectively. The unit 80 is connected to the track section 50 by leads 84 and 85. The oscillators 81 provide the low speed control operating frequency, the oscillator 82 provides the medium speed control operating frequency, and the oscillator 83 furnishes the high speed control operating frequency of each track section. The oscillators 81, 82 and 83 have associated relays 86, 87 and 88, respectively, by which each may be brought into operation. The relays 86, 87 and 88 are in wayside battery or other D.C. power circuits 89, 90 and 91, respectively. Each oscillator circuit includes two switches each operated by an appropriate one of the two next preceding track section relays 63. The unit 80A for the track section 50A is shown in the same manner as the unit 80, but the units 80B, 80C, 80D, and 80E for the corresponding track sections are shown only in block form to simplify the drawings, but the several relays, the checking circuits, and the oscillator circuits are shown in approximately the same way as in FIG. 1.

The switches for the oscillator operating circuits 89, 90, and 91 are not shown as they are located to be operated by the track section relays of the next two preceding track sections. Of the two switches in each of the circuits 89A, 90A, and 91A, only the switches 92, 93, and 94 are shown as the other switches of those circuits are operated by the track section relay of the next preceding track section. All of the other circuits and their switches are shown and the circuits are identified by the suffix letter designating the track section whose power supplies they control while their switches are distinguished by the suffix letter of the track section whose relay controls them. The switches 93 and 94 are open and the switch 92 is closed when the relay 63 is de-energized. The circuits 89B, 90B, and 91B are also controlled by the track section relay 63. The switch 92 and the switch 94 are as have been described but in place of the normally closed switch 93, a normally open switch 193 is employed and it is a characteristic of the circuitry being described, that one of the two switches in each circuit controlling an intermediate speed oscillator is open and the other closed.

The operation of the control system illustrating the invention may be understood by assuming that a train has passed from right to left through the several track sections and is now in the track section 50. As a consequence, the relay 63 is shunted out of the track circuit of that section by reason of the fact that the coil 58 of the locomotive is inductively coupled to the shunting circuit 60 thereby to energize the shunting relay 62 thus closing the shunting switch 71.

As the relay 63 is de-energized, all switches operated by it are reversed from their normal position. The switches 73 in the checking circuits 74A and 74B are closed and the switch 92 in the circuit 89A is closed and the switches 93 and 94 in the circuits 90A and 91A, respectively, are open. While the switch 92 in the circuits 89A is closed, the positions of all switches of each track relay are reversed, when the track relays are energized, and the switch corresponding to the switch 92 in the circuit 91A at the next preceding track section is open. Accordingly, no current is supplied to the track section 50A so that a following train could enter therein only at the suggested emergency speed limit of ten miles per hour.

Similarly, of the switches controlled by the track relay 63 in the circuits 89B, 90B and 91B, the switch 92 and the switch 193 are closed and the switch 94 is open.

As to the track section 50B, the relay 63A is still de-energized so that its switches 73A in its checking circuit 74B and 74C are closed. The checking relay circuit 74B is now closed and is operative to place the track section relay 63B back in its circuit. The switches 93A and 94A in the circuits 90B and 91B are open but as the switch 92A is closed, the circuit 89B is closed to effect connection of the low speed oscillator of the unit 80B to the track section 50B so that low locomotive speeds are now possible.

As to the switches in the circuits 89C, 90C, and 91C that are controlled by the track relay 63A, the switch 94A is open, the switch 92A is closed and the switch 193A is also closed. Since the track section 50B is now a live circuit, its track relay 63B is energized opening the switches 73B in the checking circuits 74C and 74D. The switch 93B in the circuit 90C is now closed as is the switch 94B in the circuit 91C, while the switch 92B in the circuit 89C is open. Of the circuits 89C, 90C and 91C, the switches 193A and 93B are both closed so that the circuit 90C is completed and this circuit results in the medium range speed oscillator of the unit 90C being operatively connected to the track section 50C.

Of the switches on the circuits 89D, 90D, and 91D controlled by the track relay 63B, the switch 94B is closed and both the switches 193B and 92B are open. Of the switches in the circuits 89D, 90D and 91D contolled by the track relay 63C, the switches 93C and 94C are closed and the switch 92C is open. As a consequence, only the circuit 91D is closed to effect the delivery of current to the track section 50D from the high frequency oscillator of the unit 80D.

In the case of the track section 50D, it is assumed that there is a train therein. Of the switches in the circuits 89E, 90E, and 91E that are controlled by the track relay 63C, the switch 94C is closed while the switches 193C and 92C are open. The switches 73D in the checking relay circuits 74E and 74F are now closed and all the switches controlled by the relay 63D in the circuits 89E, 90E, and 91E are in their normal position. As in the case of the switches controlled by the relay 63, the switches 94D and 93D are now open and the switch 92D is closed. The circuits 89E, 90E, and 91E are all open and, as no current is delivered to the track section 50E, only the low emergency speed of ten miles an hour is permitted any following train. Of the switches in the circuits 89F, 90F, and 91F that are controlled by the track relay 63D, the switch 94D is open and the switches 193D and 92D are closed.

From the foregoing, it will be appreciated that the invention provides for the control of a vehicle as it progresses through sections with its maximum speed being limited by preceding traffic that is too close or other conditions requiring reduced speed limit therein.

I claim:

1. In combination, a vehicle provided with speed control means including a coil circuit operable to be resonant at a predetermined frequency, a circuit to the propulsion unit of the vehicle and essential to the operation thereof and including a switch, and a control circuit provided with means to deliver shunting current from the vehicle and a relay to operate said switch to render said essential circuit operative, and a control system for said vehicle, said system including a series of sections each provided with a circuit to energize said coil circuit, said section circuit including a relay adjacent its entrance end, a coil operating circuit for each section including an oscillator adjacent the exit end of that section, and operable to generate said predetermined frequency, and a switch for each coil operating circuit operably associated with a preceding section relay to be actuated thereby to effect delivery of current to a subsequent section circuit at said frequency unless said preceding relay is de-energized, a shunting circuit for each section to receive current from said means when said vehicle is in that section, said shunting circuit being approximately co-extensive with the section circuit thereof and including a relay, means operable by each shunting circuit relay to shunt out the associated section circuit relay, said delivery means and said shunting circuits being inductively coupled, and a checking circuit for each section circuit including a relay operable to restore a shunted section relay if its section circuit is complete, each checking circuit including a normally open switch disposed to be closed by a section relay of a predetermined preceding section circuit when de-energized.

2. In combination, a vehicle provided with a plurality of speed controls each having a coiled circuit operable to be resonant at a predetermined different frequency, a circuit to the propulsion unit of the vehicle and essential to the operation thereof and including a switch, and a control circuit provided with means to deliver shunting current from the vehicle, and a control system for said vehicle, and a relay to operate said switch to render said essential circuit operative, said system including a series of sections each provided with a series of circuits to energize said coil circuits, each section circuit including a relay adjacent its entrance end, parallel, coil operating circuits for each section, one for each control and including an oscillator adjacent the exit end of that section and operable to generate one of said predetermined frequencies, and a plurality of switches for each coil operating circuit, the same number of switches for each coil operating circuit, the switches of said coil operating circuits being operably associated with respective ones of preceding section relays to be actuated thereby to effect delivery of current to a subsequent section circuit at successively different frequencies as a vehicle passes through said preceding sections, the corresponding switches of the coil operating circuits being controlled by the same relays between first and second positions, the first position being effected when the relay of a section circuit is energized and the second position when that relay is de-energized and then providing for slow speed operation in the next subsequent section, a shunting circuit for each section circuit to receive current from said means when said vehicle is in that section circuit, said shunting circuit being approximately co-extensive with the section circuit thereof and including a shunting relay, means operable by each shunting relay to shunt out the associated section circuit relay, said delivery means and said shunting circuits being inductively coupled, and a checking circuit for each section circuit including a relay operable to restore a shunted section circuit relay if its circuit is complete, said checking circuits including normally open switches each of which is disposed to be closed by a section circuit relay of a predetermined preceding section circuit when de-energized.

3. In combination, a vehicle provided with three speed controls each having a coil circuit operable to be resonant at a predetermined different frequency, a circuit to the propulsion unit of the vehicle and essential to the operation thereof and including a switch, and a control circuit provided with means to deliver shunting current from the vehicle and a relay to operate said switch to render said essential circuit operative, and a control system for said vehicle, said system including a series of sections each provided with a series of circuits to energize said coil circuits, each section circuit including a relay adjacent its entrance end, three parallel, coil-operating circuits for each section, one for each control and including an oscillator adjacent the exit end of that section and operable to generate one of said predetermined frequencies, one coil operating circuit being a low speed circuit, another, a medium speed circuit, and the third being a high speed circuit, two switches for each coil operating circuit, the switches of said coil operating circuits being operably associated with respective ones of preceding section relays to be actuated thereby to effect delivery of current to a subsequent section circuit at successively different frequencies as a vehicle passes through said preceding sections, the corresponding switches of the coil operating circuits being controlled by the same relays between first and second positions, the first position being effected when the relay of a section circuit is energized and the second position when that relay is de-energized, both switches of the high speed circuit and the leading switch of the medium speed circuit being closed when the appropriate relays are de-energized and both switches of the low speed circuit and the other switch of the medium speed circuit then being open, a shunting circuit for each section circuit to receive current from said means when said vehicle is in that section circuit, said shunting circuit being approximately co-extensive with the section circuit thereof and including a shunting relay, means operable by each shunting relay to shunt out the associated section circuit relay, said delivery means and said shunting circuits being inductively coupled, and a checking circuit for each section circuit including a relay operable to restore a shunted section circuit relay if its circuit is complete, said checking circuits including normally open switches each of which is disposed to be closed by a section circuit relay of a predetermined preceding section circuit when de-energized.

References Cited by the Examiner

UNITED STATES PATENTS

| | | | |
|---|---|---|---|
| 2,105,930 | 1/1938 | Reichard | 246—63 X |
| 2,163,520 | 6/1939 | Richards | 246—63 |
| 2,193,292 | 3/1940 | McDonald | 246—63 |
| 2,197,417 | 4/1940 | Place | 246—34 X |
| 2,257,473 | 9/1941 | McKeige et al. | |
| 2,537,298 | 1/1951 | Baughman | 246—41 X |
| 2,554,056 | 5/1951 | Peter et al. | 246—63 |
| 2,597,517 | 5/1952 | Noble. | |
| 2,661,070 | 12/1953 | Ferrill | 246—182 X |
| 2,930,887 | 3/1960 | Duteil | 246—34 |
| 2,948,234 | 8/1960 | Hughson | 104—26 |
| 2,951,452 | 9/1960 | Karlet | 104—26 |
| 3,045,112 | 7/1962 | Hailes | 246—63 |

ARTHUR L. LA POINT, *Primary Examiner.*

JAMES S. SHANK, LEO QUACKENBUSH,
*Examiners.*